(No Model.) 3 Sheets—Sheet 1.
J. H. SCHAEFER.
APPARATUS FOR MEASURING THE FOOT AND FITTING LASTS.
No. 263,971. Patented Sept. 5, 1882.
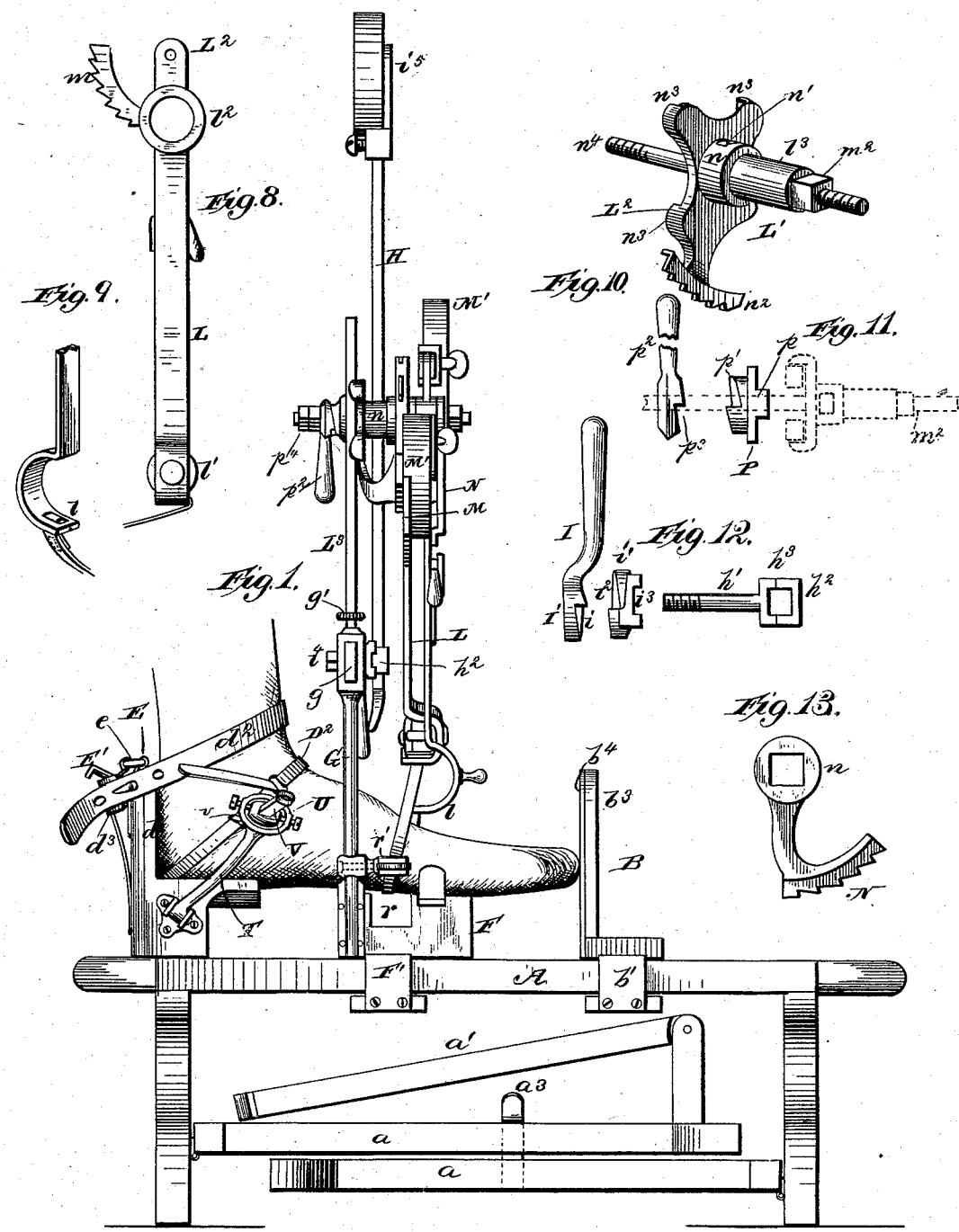
Witnesses.
Robert Everett
J. A. Rutherford
Inventor.
Joseph H. Schaefer
By James L. Norris.
Atty.

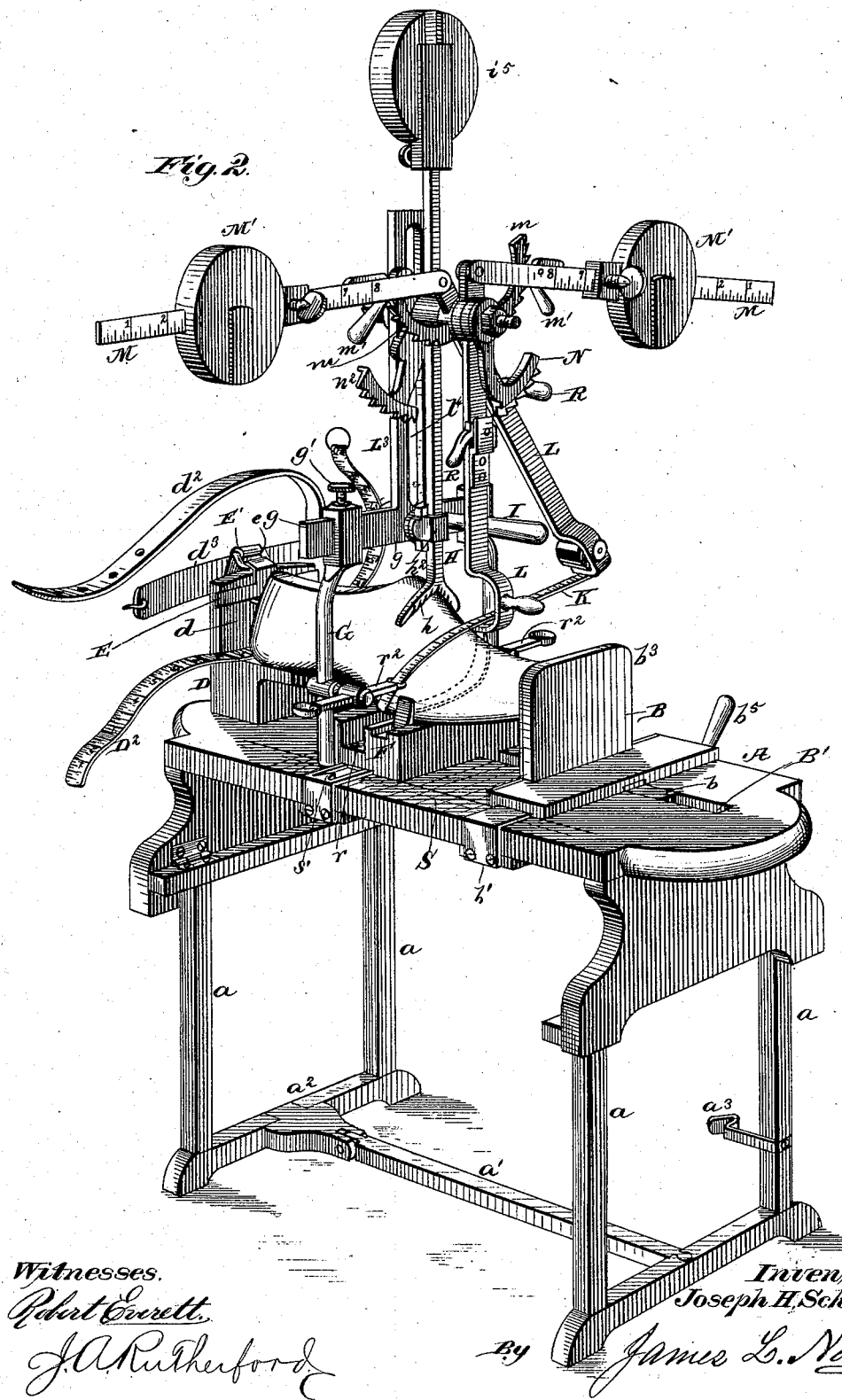

(No Model.) 3 Sheets—Sheet 3.
J. H. SCHAEFER.
APPARATUS FOR MEASURING THE FOOT AND FITTING LASTS.
No. 263,971. Patented Sept. 5, 1882.
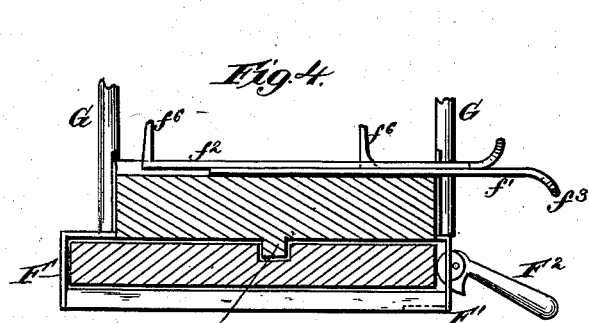
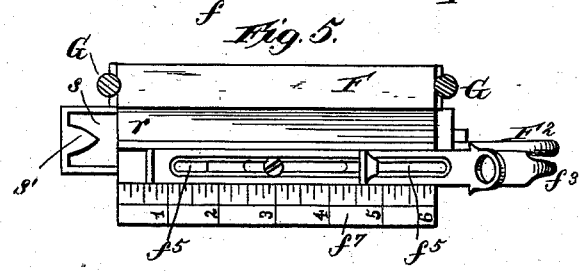
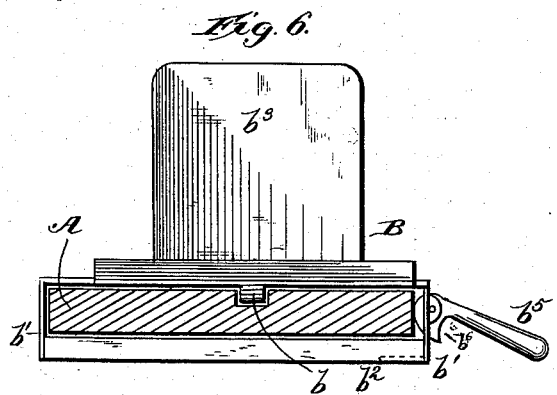
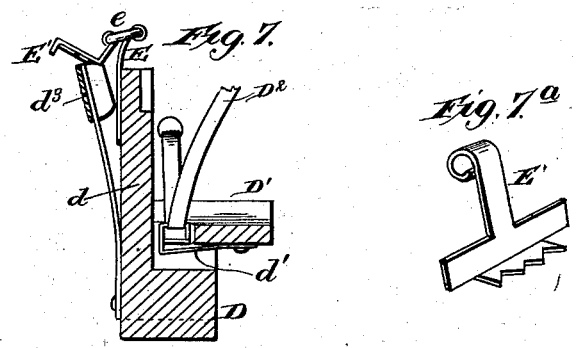
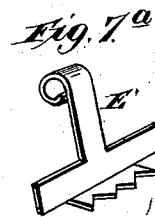
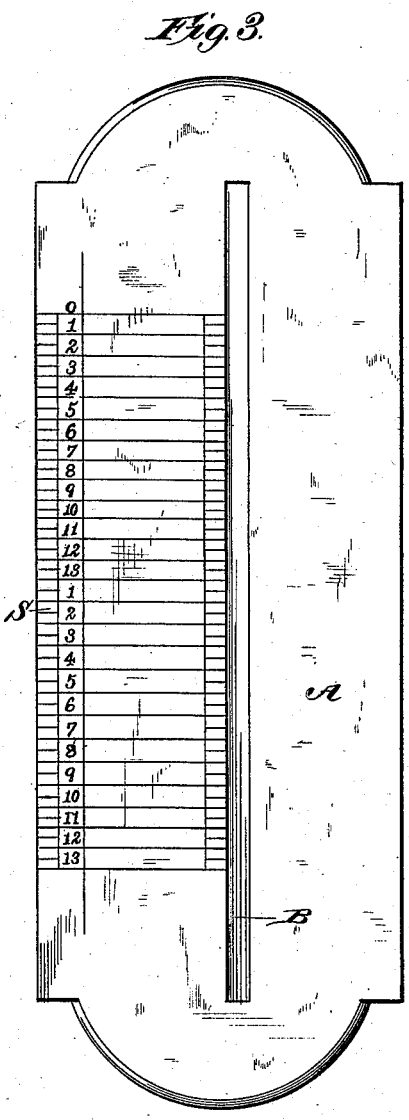
Witnesses.
Robert Ewatt.
J. A. Rutherford.
Inventor:
Joseph H. Schaefer.
By James L. Norris.
Atty.

UNITED STATES PATENT OFFICE.

JOSEPH H. SCHAEFER, OF TOLEDO, OHIO.

APPARATUS FOR MEASURING THE FOOT AND FITTING LASTS.

SPECIFICATION forming part of Letters Patent No. 263,971, dated September 5, 1882.

Application filed December 6, 1881. (No model.)

*To all whom it may concern:*

Be it known that I, JOSEPH H. SCHAEFER, a citizen of the United States, residing at Toledo, in the county of Lucas and State of Ohio, have invented new and useful Improvements in Machines for Measuring the Feet, of which the following is a specification.

The object of this invention is to provide an apparatus for accurately measuring the foot of a person, so that its exact size and shape can be determined, and all corns, bunions, or other imperfections noted.

A further object is to so construct said machine that it will also serve for fitting up the lasts after the feet of a person have been measured.

These objects I attain by means of the devices illustrated in the annexed drawings, in which—

Figure 1 is a side elevation of the apparatus with the table lowered, so as to place it in convenient position for measuring a human foot, which is shown placed upon the apparatus ready to be measured. Fig. 2 is a perspective view of the apparatus with the last placed in position to be measured, the table being elevated so as to bring the last within convenient reach of the workman. Fig. 3 is a top or plan view of the table, and shows its graduated scale and longitudinal slot. Fig. 4 is a transverse section through the movable center block, which is shown in Figs. 1 and 2 arranged between the heel and the blocks. Fig. 5 is a top or plan view of Fig. 4. Fig. 6 is a side elevation of the movable toe-block. Fig. 7 is a section taken vertically through the heel-block. Fig. 8 represents one of the measuring-tape-carrying arms which is provided with a reel. Fig. 9 shows a part of a similar arm unprovided with a reel. Fig. 10 shows in perspective a clamp-plate, spindle, and rack, which serve to support certain parts of the measuring apparatus, as hereinafter fully set forth. Fig. 11 illustrates a cam-lever with a portion of the handle broken away, a nut having a cam-face, and it also illustrates in dotted lines the clamp-plate and spindle just referred to, said dotted lines serving to illustrate the relative position of the parts. Fig. 12 shows in detail a cam-lever, a nut having a cam-face, and an eye-bolt, these devices being employed, when fitted together, to maintain in an elevated position the last holder or clamp. Fig. 13 illustrates a segment-rack, which is designed to be supported upon the squared end of the spindle shown in Fig. 10.

The letter A indicates a bed or table provided with folding legs $a$, which can be closed up, as in Fig. 1, in order to bring the apparatus into convenient position for taking the measure of a person's foot, or which can be opened so as to elevate the table with its superposed apparatus, in order to bring it into convenient position for fitting a last, as shown in Fig. 2. A stay-bar, $a'$, is hinged to an arm or bracket on one of the cross-bars $a^2$, that connect the legs, said brace serving to hold the legs apart when they are opened, as in Fig. 2, and a bent spring, $a^3$, is secured to one of the legs, so that when the legs are folded it will catch over one of the legs, and thus have a tendency to maintain them in a folded position, as shown in Fig. 1.

The letter B refers to the movable toe-block for determining the length of the foot. This block is arranged to slide upon the table, and is guided by a center tongue, $b$, which works in a longitudinal groove formed in the table. The toe-block is further guided and steadied by the side angle-plates, $b'$, which are secured to the base of the block and to a cross-piece, $b^2$, arranged below the table, said piece being free to move with the slidable block. The upright board $b^3$ of this toe-block, which is secured to the base of said device, has a facing, $b^4$, preferably of roughened rubber, which prevents injury to the toe of the person whose foot is being measured, and also tends to prevent side movement of the front portion of the foot. In order to hold this toe-block in its adjustment upon the table, I arrange the vertical portion of one of the angle-plates $b'$ at a short distance from the table-edge, and pivot in a slot in said part of the plate a hand-lever, $b^5$, having upon its inner end an eccentric, $b^6$, which, when the lever is depressed, will bind against the table, and thus secure the toe-block in position.

The heel-block D, which is fixed upon the table opposite to the toe-block, is formed with a concaved seat, D', to receive the heel of the foot or last, and has a vertical back, $d$, against which the heel is backed, as illustrated in the drawings. The heel-block is recessed to receive a spring, $d'$, and to a loop at one end of the spring is connected the instep-measuring tape D², by means of which the measure of the instep can be taken.

To the rear of the heel-block is secured a T-shaped spring, d³, to one of the horizontal arms of which is connected a brace-strap, d². This strap is provided at its free end with a series of holes, and in measuring the foot the strap is passed around the ankle and its free end caught upon a hook, on one of the horizontal arms of the T-spring, whereby the heel will be held securely on the heel-block.

A short spring-plate, E, is secured to the back of the heel-block, and a metal T-plate, E', provided with a line of teeth (see detached view, Fig. 7ª) is hinged, by means of a loop, e, to the said plate E'. This T-plate can be swung over against the front of the vertical portion of the heel-block when a last is placed in the apparatus, the teeth engaging the back of the heel portion of the last, and thus holding the same down upon the concave seat; but when the foot of a person is to be measured, the toothed T-plate will be swung back out of the way, as illustrated in Figs. 1 and 7.

F indicates a movable center block, arranged to slide upon the table between the heel and toe blocks, and guided by a tongue, f, that enters the groove B' in the table. This block supports the forward part of the foot or last, as shown in Figs. 1 and 2, and it also constitutes a support for the devices adapted for measuring the foot from ankle to toe, as presently described. The block F is formed with a transverse channel, in which I arrange the two slidable gage-plates f' f², that are employed for measuring the width of the foot. The gage-plate f' rests upon the bed of the said transverse channel, and is provided at its outer end with a handle, f³, whereby it can be conveniently moved back and forth. The gage-plate f² rests upon the lower plate, f', and both of these plates have a longitudinal slot, f⁵, through which passes a screw or stud that is secured to the block, said stud serving to assist in guiding the gage-plates, and also serving to prevent them from being entirely drawn out from the channel. Each gage-plate is also provided with an upright stop or finger, f⁶, these fingers being brought against the foot in measuring, so as to determine the width of the various parts of the foot. A scale, f⁷, of inches and fractions of inches will be made upon the block alongside of the channel in which these gage-plates work, so that a record of the measure can be taken. This block F is held down upon the table by an angle-plate, F', secured to a cross-piece below the table, and a hand-lever, F², having an eccentric at one end, is pivoted to one of said plates for the purpose of holding the block in adjustment, the same as in the case of the toe-block already described.

To the sides of the block F are secured the two standards, G G, supporting at their upper enlarged ends a horizontal cross-bar, g, which passes through mortises that are formed through said upper ends of the standards, whereby the cross-bar can be adjusted laterally with relation to the length of the table, in order to bring the devices supported by said bar into proper position. A set-screw, g', is employed to secure the said bar in its adjustment, said screw passing through the upper end of either standard.

As an additional means for holding down a last in the apparatus, as illustrated in Fig. 2, I employ a vertically-movable bar, H, having at its lower end a toothed fork or claw, h, adapted to embrace the upper part of the last. The devices employed for guiding said bar and for holding it up when desired, or for releasing and allowing it to drop, are as follows:

A bolt, h', (see especially Fig. 12,) screw-threaded at one end and formed with a rectangular eye, h², at its opposite end, passes through the horizontal cross-bar g. The upper and lower portions of the eye that are next to the shank of the bolt are recessed or cut away, one of said recessed sides being indicated by h³ in Fig. 10. Upon this bolt and next to the horizontal bar g is pivoted a lever, I, the hub I' of which (through which the bolt passes) being formed with a cam-face, i. Upon the same bolt, and between the cam-faced hub of this lever and the rectangular eye of the bolt, is arranged a nut, i', having a cam, i², on its face that is next to the lever. The other face of this nut is formed with a vertical and a horizontal channel, the latter being indicated by i³. Now, by referring to Fig. 2, it will be seen that this nut partly embraces the vertical bar H, said bar being received in the vertical channel of the nut, and that by reason of the similarly-formed horizontal channel of the nut and the reduced portions of the eye of the bolt the nut will interlock with the eye of the bolt, as illustrated in said figure. A nut, i⁴, will be fitted upon the screw-threaded end of the bolt on the opposite side of bar g, as shown in Fig. 1. By this arrangement of parts it will be seen that by moving the lever in one direction the cam upon the side of its hub acting upon the cam upon the side of the nut will force the nut against the vertical bar H, the cut-away portions of the eye of the bolt allowing the nut to approach the bar for such purpose. The nut then binding upon the bar will securely hold it until the lever is raised, when the bar, being freed from pressure of the nut, will readily drop by gravity. To insure the ready dropping of this bar a weight, i⁵, is adjustably secured upon its upper end.

The above-described last-holder is of course only brought into use when a last is fitted in the apparatus, and when the foot of a person is to be measured said bar will be raised and held in an elevated position, as in Fig. 1, by means of the nut i' and lever.

The devices employed for measuring the circumference of the foot, and for accurately indicating corns, bunions, or any other irregularity, are as follows:

To measure around the foot I use a tape-measure, K, and to first spread out the tape so that the foot or the last can be placed upon it, and to then draw the tape-measure round the foot by mechanical means instead of by hand, I connect the ends of the tape-measure with two swinging arms, L, which, when swung apart, will straighten out the tape as far as necessary, and which, when brought together and then swung past each other, will cross the tape and draw it around the foot or last, as best shown in Fig. 2. The tape is secured directly to one end of these arms, as at $l$, Fig. 8; but at the end of the other arm it connects with a reel, $l'$, for holding the surplus tape, as shown in said figure. A suitable tightening-screw will be employed for securing this reel against rotation, so that the tape will not run out to a greater extent than may be determined by the operator, and a spring can be used for reeling up the tape.

Each arm L has a hub, $l^2$, near its upper end, and these hubs are loosely mounted upon the cylindrical portion $l^3$ (see Fig. 10) of a spindle, L', which extends out from a plate, $L^2$, that is maintained in connection with a slotted vertical bar, $L^3$. (Shown in Figs. 1 and 2.) This slotted bar rises from the horizontal cross-bar $g$, and has its slot $l^4$ made to extend nearly from end to end.

To the upper end, $L^2$, above the hub $l^2$ of each arm L is pivoted an arm, M, provided with a graduated scale and carrying an adjustable weight, M', which can be shifted toward or away from the pivot of the arm, so as to vary the tension of the lower arm L upon the tape-measure when the two arms are connected by a pawl and ratchet, as presently set forth. The purpose of the scale on each arm M is to indicate the position of the weight, and by adjusting the weight the tension of the tape can be varied so as to measure for a tight or loose fitting boot or shoe. Each weight has a dovetailed rib, whereby an additional weight can be employed when an extra tight fit is required.

In order to vary the angle between two pivotally-connected arms, L and M, and also to hold the same rigidly together, each arm L is provided with a segmental rack, $m$, passing up through that weighted arm with which the arm L connects. The weighted arms M will be slotted to admit this passage of the segment-racks through them, and they will also be provided with spring dogs or pawls $m'$ for engaging the racks upon the arms L. These pawls and ratchets will be used in taking small measurements—as, for instance, around the toes—for the purpose of keeping the weighted arms in a horizontal position and maintaining an even tension in all measurements. The spindle L', supporting these swinging arms, is squared near its end, as at $m^2$, and upon this squared end is fitted the hub $n$ of a segment-rack, N, (shown separately in Fig. 13,) and upon a screw-threaded end of the spindle will be fitted nuts for holding said arm of the rack upon the spindle. Between the cylindrical portion of the spindle upon which the arms L are supported and the plate $L^2$ the spindle is enlarged and a mortise, $n'$, formed through it for the vertical bar H.

The plate $L^2$ is formed at its lower extremity with a segment-rack, $n^2$, which extends out to one side of the vertical slotted bar $L^3$, as shown in Fig. 2. This plate is formed with corner ears $n^3$, which embrace the edges of the vertical slotted bar $L^3$, and a bolt, $n^4$, projecting from that side of the plate that is opposite to the spindle L' just described, passes through the slot of bar $L^3$. This plate, which through its spindle supports the several arms, as aforesaid, is adjustable upon the vertical slotted bar, in order to vary the height of this portion of the measuring apparatus according to the wish of the operator. To accomplish this adjustment mechanism substantially the same as that employed for holding up bar H is employed. The mechanism for accomplishing this will be best illustrated by the detached views, Fig. 11. The nut P shown in this figure is provided on one side with two projections, $p$, one of which only is shown, and it is provided with a cam, $p'$, on its opposite side. This nut is placed upon the smooth portion of the bolt or spindle $n^4$, with its projections $p$ entering the slot of standard $L^3$, so that it will be prevented from rotating. A cam-lever, $p^2$, is also fulcrumed upon this bolt or spindle $n^4$, with the cam-face $p^3$ of its hub next to the cam-face of the nut, and upon the screw-threaded end of the bolt are secured nuts $p^4$, as shown in Fig. 1. When this cam-lever $p^2$ is depressed its cam, acting upon the cam of the nut, will force the nut against the standard, and also force the hub of the lever out against the nuts $p^4$, which are secured upon the bolt or spindle $n^4$. This operation will draw the bolt $n^4$ laterally from the slotted standard, and hence clamp the plate $L^2$ against the latter. By raising the lever, however, such pressure will be relieved, and hence the plate can be moved up or down as occasion may require.

Each arm L carries a spring dog or pawl, R, provided with a suitable handle, and these pawls are adapted to engage the stationary segmental racks N $n^2$ when the arms are swung apart into certain positions, as will be hereinafter set forth.

The slidable block between the heel and toe blocks has a transverse channel, $r$, for the middle part of the measuring-tape to be in before the foot or last is placed upon the block, said channel being shown in Figs. 1 and 2.

To each standard G is swiveled a hub, $r'$, and through a mortise formed through each hub a slidable bar, $r^2$, passes, having a loop at its inner end. The tape passes through the loops of these said guide-bars, and is not only guided thereby, but it is also held down in the channel before a last or boot is placed upon the block, since by pushing in the guide-bars their inner ends will drop down into the channel, and thus hold the tape down when it is crossed or uncrossed by the swinging arms L.

Upon the table, near one edge, is a graduated scale, S, (see Fig. 3,) with numbers running, say, from 1 to 13, and then continuing on from 1 to 13. The numbers from 1 to 13 commencing near the heel-block indicate children's sizes of boots or shoes, and those next succeeding indicate men's sizes. Said numbers are also employed with reference to the sliding center block, as presently set forth. One of the angle-plates attached to this block F is cut out, as shown at $s$, Fig. 5, and a pointer, $s'$, formed by such plate, which pointer operates in conjunction with the scale S to indicate the adjustments of the center block. (See Fig. 1.)

As a means for guiding and directing the instep-measuring tape, I pivot a curved arm, T, (see Fig. 1,) to one side of the heel-block, and in an eye at the upper end of the arm journal a hub, U. A slide-bar, V, having a loop, $v$, passes through this hub, and the tape is passed through this loop. When not in use, the bar can be swung out of the way. A spring will also be provided for holding said arm in position.

In measuring a person's foot the serrated holder E' will be thrown back out of the way, and the serrated last-holder $h$ will be raised and secured in an elevated position, so as not to touch the foot. The arms L will then be placed in rigid connection with and at a proper angle to their respective weighted arms M by engaging the pawls of said weighted arms with the rack-segments $m$. Said arms L will also be swung apart, so as to practically straighten out the tape-measure connected therewith, the position of said arms in this instance being the reverse to that shown in Fig. 2—that is to say, each arm L will be on the same side of the machine as the weighted arm which is pivoted to it—and the arms will be held in such position by engaging the pawls R with the stationary rack-segments N $n^2$. The foot will now be rested upon the center block, F, with the heel upon the heel-block, the brace-strap $d'$ being tightened round the ankle and then secured. The measuring can now be proceeded with. The length of the foot, and hence the number of the last, can be readily determined by pushing up the toe-block against the foot, the angle-plate secured to the toe-block on the side of the table bearing the scale indicating the number on the scale. The instep-measuring tape $D^2$ can be utilized for measuring the instep by drawing it down upon the foot. To take the measure around the foot the operator will release the pawls R from their engagement with the stationary segmental racks N $n^2$, and in so doing the arms L will, by reason of the weights upon the arms M, (which, though pivoted to arms L, are still held in rigid connection by the pawls and racks $m$ $m'$,) swing down and resume about the position shown in Fig. 2, thereby drawing the tape-measure around the foot and crossing the same above the foot, as shown in said Fig. 2. The guide-bars $r^2$ will at this juncture be drawn up, as shown, but will in no wise interfere with the taking of an accurate measurement. The center block, F, can then be moved along and the measure of the foot taken at the appropriate intervals, the pointer $s'$, in connection with the scale S upon the table, indicating the distance from the heel where such measure is taken. The width of the foot will also be taken by means of the slidable gage-bars $f'$ $f^2$, which can be readily manipulated for such purpose. The several measurements can be taken down upon a blank prepared for such purpose, if desired.

It will be understood that the levers with eccentrics for holding the center and toe blocks at any given point can be manipulated by depressing the lever when it is necessary to secure the block.

In fitting up a last after a complete measure of the foot has been taken the apparatus will be manipulated in the same way, as already described, except that the serrated last-holder E' will be swung over, as shown in Fig. 2, and the serrated holder H $h$ let down to hold the last. The toe-block can then be moved up and the process of fitting up the last proceeded with, the required size and shape being determined from the record of measurements already taken.

What I claim is—

1. An apparatus for measuring feet combining in its structure a supporting-table, a heel-supporting block provided with an instep-measuring tape, an adjustable toe-supporting block, and an adjustable center block provided with laterally-movable upright stops or fingers for measuring the width of the foot, and a tape and devices connected therewith for crossing and drawing the same around the foot adjacent to the center block, substantially as described.

2. The combination, with a bed or table, A, heel, toe, and center blocks supported thereon, and devices, substantially as described, for measuring the feet and holding and fitting up a last, and adjustable legs supporting the bed or table, whereby the latter can be lowered to measure the foot and raised to fit up a last, as set forth.

3. The combination, in a foot-measure, of the bed or table, the heel-block provided with an attached instep-measuring tape, a center block, a tape for measuring around the foot, and movable arms connected with the latter tape, and adapted to mechanically straighten the same and draw it around the foot, substantially as described.

4. The heel-block provided with a spring, $d^3$, a brace-strap, $d^4$, and an instep-measuring tape, D', substantially as described.

5. The heel-block provided with a rest for the heel, and with an instep-measuring tape connected with a spring arranged within a recess in the heel-block, substantially as described.

6. The combination, with the table and the slidable center block, F, of the vibratory arms L, carrying a tape-measure for measuring round the foot, substantially as described.

7. The combination, with the table and the slidable center block, F, of the vertically-movable bar H, having the serrated holder at its lower end, and devices for holding said bar and holder in an elevated position when desired, substantially as described.

8. The combination, with the swinging arm L, carrying the measuring-tape, of the arm M, carrying adjustable weights and pivoted to the tape-carrying arms, the pawls upon the weighted arms, and the segment-racks upon the tape-carrying arms, by means of which the pivoted arms can be held rigidly together in pairs, in the manner described.

9. The combination, with the measuring-tape-carrying arms, of the pawls pivoted thereto, and the stationary segment-racks arranged in position to be engaged by said pawls when the arms are vibrated in a direction to spread out the tape-measure, substantially as described.

10. The combination, with the movable center block, F, of the vertical slotted standard $L^3$, supported upon said block, and the vibratory tape-carrying arms, the pivoted weighted arms, and the four segment-racks, all supported by a spindle connected with the slotted bar, and held in adjustment thereon by a cam-lever, substantially as described.

11. The combination of the weighted bar H, having the serrated holder $h$, with the herein-described cam-lever, cam-faced nut, eyebolt $h'$, and horizontal bar $g$, all constructed and all arranged to hold said bar H in the manner and for the purpose specified.

12. The combination, with the movable center block, F, having the channel $r$, of the vibrating tape-carrying arms L and the tape-guide arms $r^2$, arranged to slide through the oscillatory hubs, substantially as described.

13. The combination, with the tape-carrying arms L, provided with segmental racks $m$, of the pivoted arms M, provided with a graduated scale and carrying the adjustable weights, and the pawls adapted to engage the racks of the tape-carrying arms, substantially as described.

14. The combination, with the instep-measuring tape, of the swinging arm carrying the hub U, having a mortise through which the bar for guiding and directing the tape is arranged to slide, substantially as described.

In testimony whereof I have hereunto set my hand in the presence of two subscribing witnesses.

JOSEPH H. SCHAEFER.

Witnesses:
   EDWARD H. RHOADES,
   JOSEPH N. CLOUSE.